United States Patent
Cameron et al.

(10) Patent No.: US 11,521,089 B2
(45) Date of Patent: Dec. 6, 2022

(54) IN-DATABASE PREDICTIVE PIPELINE INCREMENTAL ENGINE

(71) Applicant: SAP SE, Walldorf (DE)

(72) Inventors: Scott Kumar Cameron, Paris (FR); Olivier Hamon, Rennes (FR); Gabriel Kevorkian, Suresnes (FR); Eric Gouthiere, Suresnes (FR); Jacques Doan Huu, Guyancourt (FR)

(73) Assignee: SAP SE, Walldorf (DE)

( * ) Notice: Subject to any disclaimer, the term of this patent is extended or adjusted under 35 U.S.C. 154(b) by 798 days.

(21) Appl. No.: 16/204,000

(22) Filed: Nov. 29, 2018

(65) Prior Publication Data
US 2020/0175402 A1    Jun. 4, 2020

(51) Int. Cl.
*G06N 5/04* (2006.01)
*G06N 20/00* (2019.01)
*G06F 9/38* (2018.01)

(52) U.S. Cl.
CPC .............. *G06N 5/042* (2013.01); *G06F 9/38* (2013.01); *G06N 20/00* (2019.01)

(58) Field of Classification Search
CPC .......... G06N 5/042; G06N 20/00; G06F 9/38
USPC ........................................................ 706/46
See application file for complete search history.

(56) References Cited

U.S. PATENT DOCUMENTS

| | | | | |
|---|---|---|---|---|
| 2004/0210624 | A1* | 10/2004 | Andrzejak | H04L 67/1074 709/201 |
| 2015/0234688 | A1* | 8/2015 | Dageville | G06F 16/128 718/105 |
| 2019/0349426 | A1* | 11/2019 | Smith | H04L 67/104 |

OTHER PUBLICATIONS

Han, et al., "Toward On-Line Analytical Mining in Large Databases", ACM SIGMOD Record, vol. 27, issue 1, Mar. 1998 (Year: 1998).*

* cited by examiner

*Primary Examiner* — Tsu-Chang Lee
(74) *Attorney, Agent, or Firm* — Buckley, Maschoff & Talwalkar LLC

(57) ABSTRACT

A predictive model pipeline data store may contain electronic records defining a predictive model pipeline composed of operation nodes. Based on the information in the data store, an execution framework platform may calculate a hash value for each operation node by including all recursive dependencies using ancestor node hash values and current node parameters. The platform may then compare each computed hash value with a previously computed hash value associated with a prior execution of a prior version of the pipeline. Operation nodes that have an unchanged hash value may be tagged "idle." Operation nodes that have a changed hash value may be tagged "train and apply" or "apply" based on current node parameters (and an "apply" tag may propagate backwards through the pipeline to ancestor nodes). The platform may then ignore the operation nodes tagged "idle" when creating a physical execution plan to be provided to a target platform.

20 Claims, 15 Drawing Sheets

IN-DATABASE PREDICTIVE PIPELINE INCREMENTAL ENGINE

BACKGROUND

Predictive modeling is a process to leverage statistics and mathematical methods to analyze data, find patterns and produce models that can help predict a particular outcome. The predictive models are typically built on a sample of historic data and can then be applied to a different dataset, typically with current data or events, for a business purpose.

A predictive model may be built and represented as a pipeline of data operations. Testing and improving such a pipeline may involve an iterative and complex process to tune the overall modeling performance by trying different predictive algorithms (e.g., Random Forest algorithms, Support Vector Machines, etc.), using different hyper-parameters, and testing different types and patterns of data transformation (also known as feature engineering).

As a result, a predictive model pipeline may be built and executed gradually with successive modifications (including node additions, node deletions, node alterations, etc.). Moreover, predictive models often operate on huge datasets (e.g., datasets that contain millions of rows) to achieve statistical significance. Re-executing previously defined operations every time the pipeline is slightly modified can be a time-consuming process that may frustrate a user. Indeed, a user may expect that a predictive system should be smart enough to execute only the minimum increment of operations required as a result of his or her changes (and otherwise by leverage data results that already exist because they were produced in a previous run of the pipeline). Supporting this type of incremental execution may provide an important advantage in the machine learning modeling tool market. In particular, it may provide for an interactive experience (where the user modifies, executes, and then analyzes results) during predictive model pipeline creation.

It would therefore be desirable to provide for incremental execution of a predictive model pipeline in a fast, automatic, and accurate manner.

SUMMARY

According to some embodiments, methods and systems may include predictive model pipeline data store that contains electronic records defining a predictive model pipeline composed of operation nodes. Based on the information in the predictive pipeline data store, an execution framework platform may calculate a hash value for each operation node by including all recursive dependencies using ancestor node hash values and current node parameters. The platform may then compare each computed hash value with a previously computed hash value associated with a prior execution of a prior version of the pipeline. These hash values may be persisted into the execution state repository in conjunction with the previous run modeling cache. The execution framework might only cache node results which are expensive to be re-evaluated identically (when the inputs are unchanged). It may be applicable, for example, a learning/training outcome model produced by a predictive node. Operation nodes that have an unchanged hash value may be tagged "idle." Operation nodes that have a changed hash value may be tagged "train and apply" or "apply" based on current node parameters (and an "apply" tag may propagate backwards through the pipeline to ancestor nodes). The platform may then ignore the operation nodes tagged "idle" when creating a physical execution plan to be provided to a target platform.

Some embodiments comprise: means for accessing, by a computer processor of an execution framework platform, a predictive model pipeline data store that contains electronic records defining a predictive model pipeline composed of operation nodes; based on the information in the predictive pipeline data store, means for calculating a hash value for each operation node by including all recursive dependencies using ancestor node hash values and current node parameters; means for comparing each computed hash value with a previously computed hash value associated with a prior execution of the predictive model pipeline; for operation nodes that have an unchanged hash value, means for tagging the operation node as "idle;" for operation nodes that have a changed hash value: (a) means for tagging each operation node as "train and apply" or "apply" based on current node parameters, and (b) means for propagating an "apply" tag backwards through the predictive model pipeline to ancestor nodes; means for ignoring the operation nodes tagged "idle" when creating the physical execution plan based on the operation nodes tagged "train and apply" and "apply;" and means for providing the physical execution plan to a target platform.

Some technical advantages of some embodiments disclosed herein are improved systems and methods to provide for incremental execution of a predictive model pipeline in a fast, automatic, and accurate manner.

DETAILED DESCRIPTION

Figure 1:
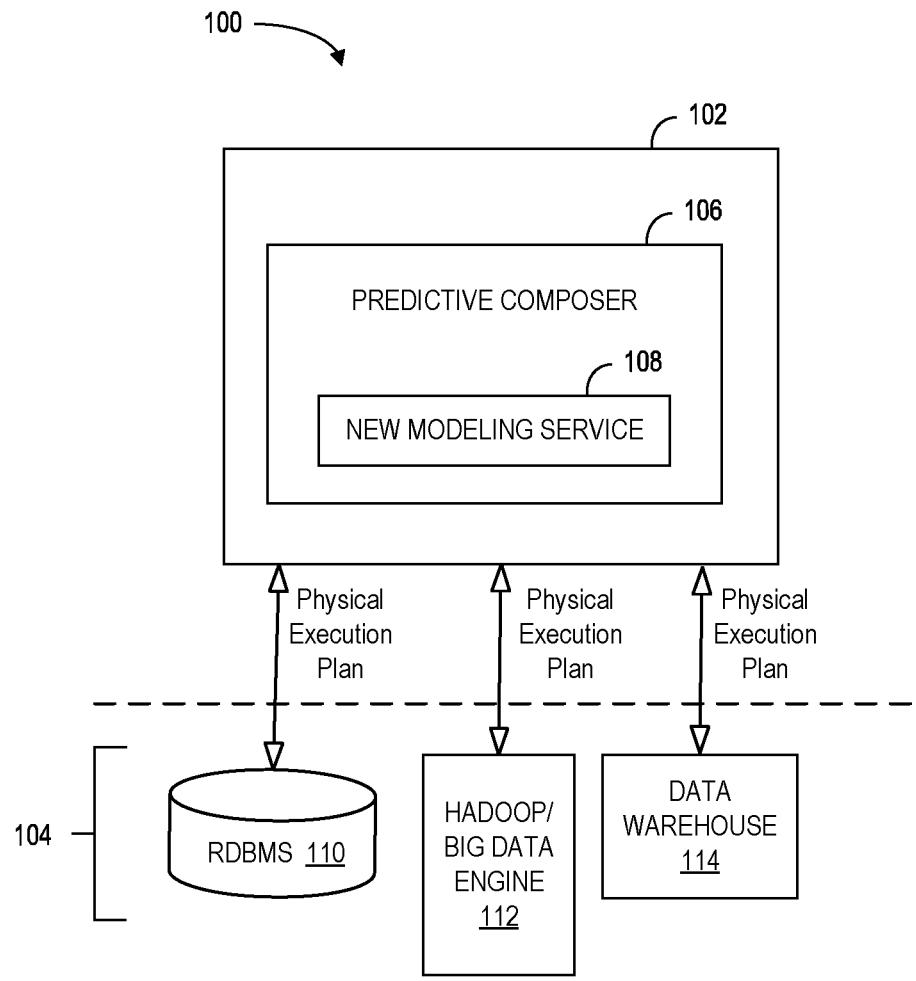
FIGS. 1 and 2 depict example environments for in-database modeling in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

There are many different approaches to predictive modeling. For example, regression modeling predicts a value, while classification distinguishes hidden groups in the data. Additionally, there is a large number of machine learning algorithms, techniques, and implementations that vary between off-the-shelf (for example, the k-means algorithm in R) to proprietary approaches. In particular, proprietary approaches can leverage machine learning techniques such as Vapnik-Chervonenkis theory and Structural Risk Minimization to build better quality and more generally applicable models. The quality and robustness of the model can be analyzed based on i) quality, e.g., how well a model describe the existing data—this is achieved by minimizing the empirical error; and ii) reliability or robustness: how well a model will predict when applied to new data—this may be achieved by minimizing the unreliability. Some predictive modeling solutions rely on database connectivity such as Open Database Connectivity ("OBDC") and Java Database Connectivity ("JDBC") to connect to a Relational Database Management System ("RDBMS"). According to some embodiments, an execution plan specific is pushed to a target platform (RDBMS, Hadoop/Spark) to avoid data transfer to the client machine and to leverage the target data platform's ability to process a substantial amount of data (e.g., in-database learning).

Note that predictive modeling can be data intensive. For example, a data preparation phase and a learning (or training) phase can require many sweeps of the same data and many calculations on each individual input parameters. Consider a cross statistics step in an algorithm. Such a step may require that statistics be calculated on every input variable with every target variable.

Some embodiments described herein may be associated with automatic, in-database predictive modeling. Such modeling may be performed in a Big Data environment to overcome the performance and scalability limitations of modeling within a traditional architecture, such as the limitations described above. Note that traditional modeling may be performed on the client side, thus requiring large datasets to be communicated from data storage to the client (and consuming large amounts of network bandwidth). According to some embodiments, at least some of the processing is performed on the cluster, and some is performed by the client application (e.g., modeler), thus reducing the amount of network bandwidth needed to transfer large datasets to the client application and perform modeling jobs solely on the client side. In some instances, the more data-intensive and/or processing intensive processing steps may be performed on the cluster to take advantage of greater processing capabilities of the cluster. Moreover, because the cluster may be closer to the data storage in a network topology, performing more data intensive operations of the cluster may avoid consuming network bandwidth that would otherwise be consumed by communicating large amounts of data back and forth between the data storage and the modeler. As described herein, in-database modeling may be modeling that is performed at least partly in a cloud or cluster (e.g., a distributed processing platform) where the data being analyzed is also stored. Accordingly, in-database modeling may provide advantages for security, given that in-database analysis may avoid communicating data over possibly insecure communication channels. Moreover, sensitive and/or private data such as Personality Identifiable Information ("PII") may be more securely handled on the cluster as compared to other systems.

FIG. 1 illustrates an example environment 100 for in-database modeling. Specifically, the environment 100 includes a server computing system 102 and a data platform 104 that may exchange a physical execution plan. The server computing system 102 can include one or more computing systems, including a cluster of computing systems. The data platform 104 can include one or more computing systems (e.g., nodes), including multiple user-based computing systems. The server computing system 102 can include predictive composer 106 that includes a modeling service 108. The data platform 104 can include a RDBMS 110, one or more Hadoop/big data engines 112, and/or a data warehouse 114. According to some embodiments, the engines 112 may be described as Big Data engines. Note that it is possible to submit a data job to a Spark distributed processing system programmatically by running a custom main program without going through Standard Query Language ("SQL") (which is an alternative). In some examples, the engines 112 can include Apache Spark or Apache Hive. Spark, for instance, is not SQL-based but relies on the description of a graph of operations which is serialized and interpreted to trigger operation execution. Although implementations of the present disclosure are discussed herein with reference to data platform 104 that is an example distributed processing platform, e.g., the Hadoop framework developed by the Apache Software Foundation, it is contemplated that implementations of the present disclosure can be realized using any appropriate distributed processing platform. Although the server computing system 102 is described as a server, the system 102 and/or the modeling service 108 may act as a client in its interactions with the data platform 104.

Figure 2:
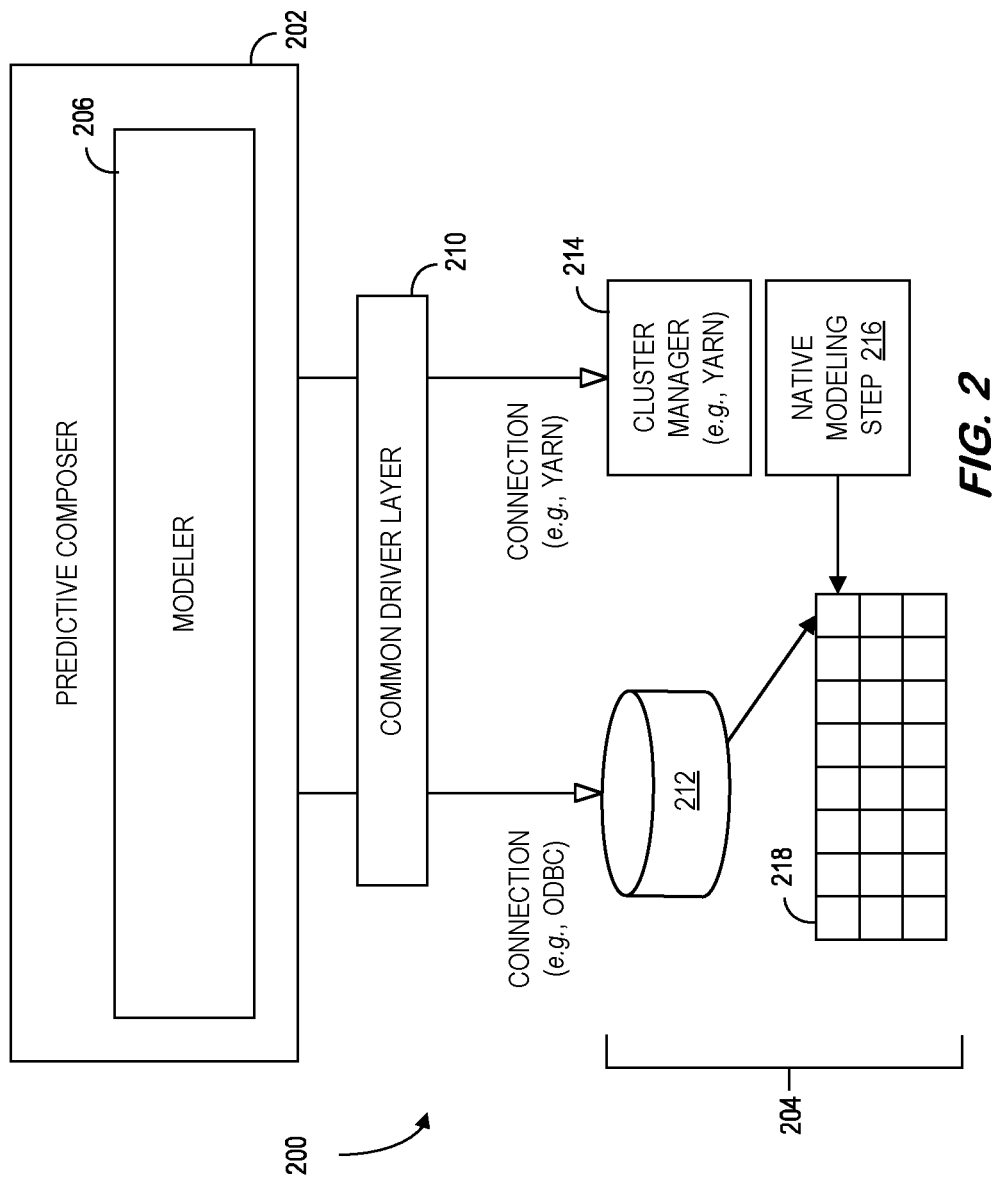

FIG. 2 illustrates an example environment 200 for in-database modeling, similar to the environment 100. The environment 200 includes predictive composer module 202 and a set of clusters 204. The set of clusters 204 may comprise a distributed processing platform for data processing. In some implementations, the set of clusters 204 is an Apache Hadoop cluster. The predictive composer module 202 includes a modeler 206. According to some embodiments, both RDBMS and Spark (through Yet Another Resource Navigator ("YARN")) channels go through a common driver layer 210 handling the interaction with target platforms. As used herein, the term "YARN" may refer to an Apache Hadoop resource management and job scheduling technology responsible for allocating system resources to various applications running in a cluster and scheduling tasks to be executed on different cluster nodes. Each target platform may have its own driver implementation sharing the same API. This API might, for example, manage the connection and execution of the physical plan. In some instances, the set of clusters 204 includes a data warehouse 212, a cluster manager 214, a module 216 that is associated with native modeling steps, and a distributed file system 218. In some implementations, the data warehouse 212 is an Apache Hive data warehouse. The connectivity module 208 may establish a connection (e.g., ODBC connection) to the data warehouse 212. In some implementations, the cluster manager 214 is a YARN cluster manager. The environment 200 may create a connection (e.g., YARN connection) to the cluster manager 214. In some implementations, the module 216 is an Apache Spark module, and the associated modeling steps are native Spark modeling steps. In some implementations, the file system is an Apache Hadoop Distributed File System ("HDFS"). In some implementations, the predictive composer module 202 is in communication with the set of clusters 204. An input training dataset (e.g., a business dataset) can be transferred over one or both of the connections to the set of clusters 204. According to some embodiments, in-database learning imposes no intensive dataset transfer between the client and set of clusters 204 (e.g., only lightweight metadata is authorized). Furthermore, the data warehouse 212 and the module 216 can communicate with the distributed file system 218, e.g., for in-database modeling. In some implementations, the communications between the set of clusters 204 and the predictive composer module 202 may employ the unified client.

The predictive composer module 202 may use an ODBC connection to interact with the data warehouse 212 to retrieve result sets of processing performed on the set of clusters 204 by the native modeling step(s), e.g., Spark job(s). The YARN connection may be employed to request that jobs be run, e.g., through native modeling steps, on the set of clusters 204. The results of the native modeling steps (e.g., the Spark job(s)) may be written to the file system 218 (e.g., HDFS). In some instances, the results may be copied from the file system 218 to the data warehouse 212 to be accessible by the predictive composer module 202 through the unified client.

In some examples, the in-database modeling performed by the environment 100 can be associated with an approach to perform the data processing close to the source of the data. In some examples, in-database modeling of the environment 100 is associated with the use of in-database processing for predictive modeling. The predictive modeling can include generating database specific code (e.g., SQL or stored procedures) to delegate the modeling process (e.g., within the environment 100) in a language that is optimized for the data platform 104.

In some examples, the in-database modeling that is associated with the environment 100 can include a data preparation phase, a learning (training) phase, a scoring phase, and/or a retraining phase. The data preparation phase is associated with cleansing of the data and handling of outliers associated with the data. The data preparation phase can also involve increasing the number of input variables using data manipulation (e.g., by using SQL window functions) to facilitate finding patterns in the data. For example, finding patterns of buying behavior across a month as opposed to patterns at minute level. The learning (training) phase is associated with application of algorithms and techniques to an input training dataset. In some examples, the process of building models can be iterative to identify an appropriate model. This can be performed through software or through manually changing model inputs using business domain knowledge. Additionally, the learning (training) phase can be associated with such concepts as over-fitting and robustness. Furthermore, the result of the model building can include an output that can be used in the scoring phase. The scoring phase is associated with application of the training model. The model can be embedded in business applications or used as a micro-service to predict results for a given input. The retraining phase is associated with ensuring that the existing models are accurate and providing accurate predictions with new data, including model comparison and retriggering of the learning process taking into account more recent data.

Figure 3A:
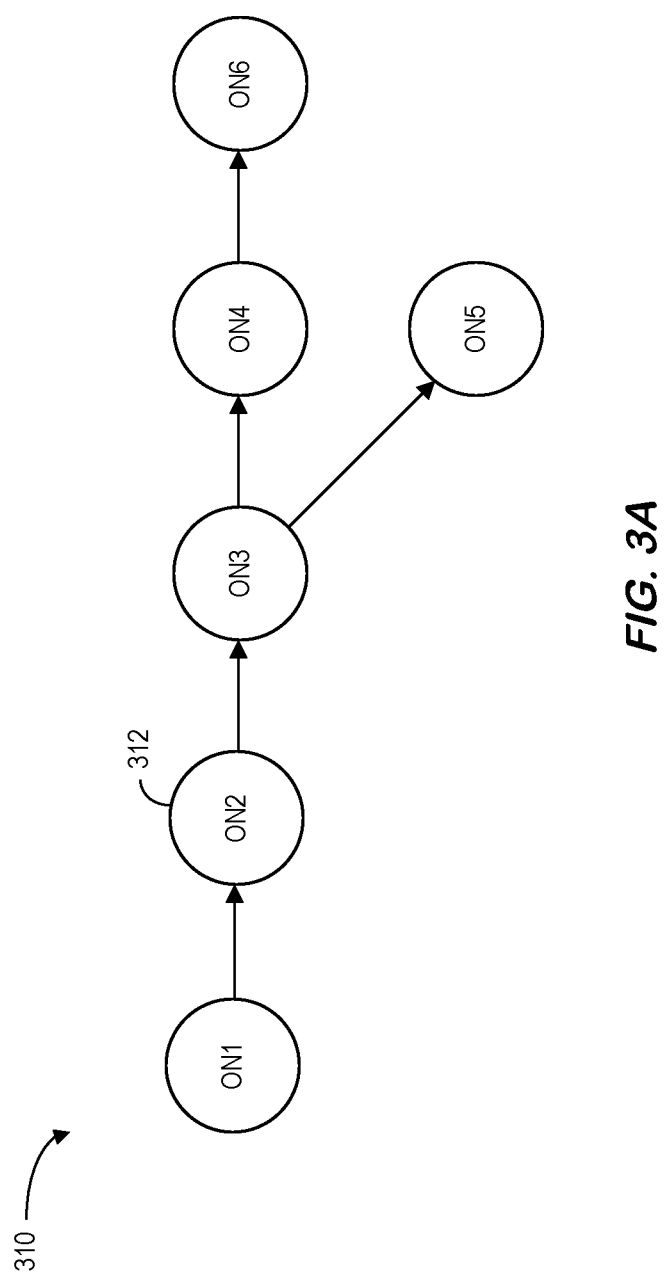
FIGS. 3A through 3C illustrate predictive model pipelines according to some embodiments.
Figure 3B:
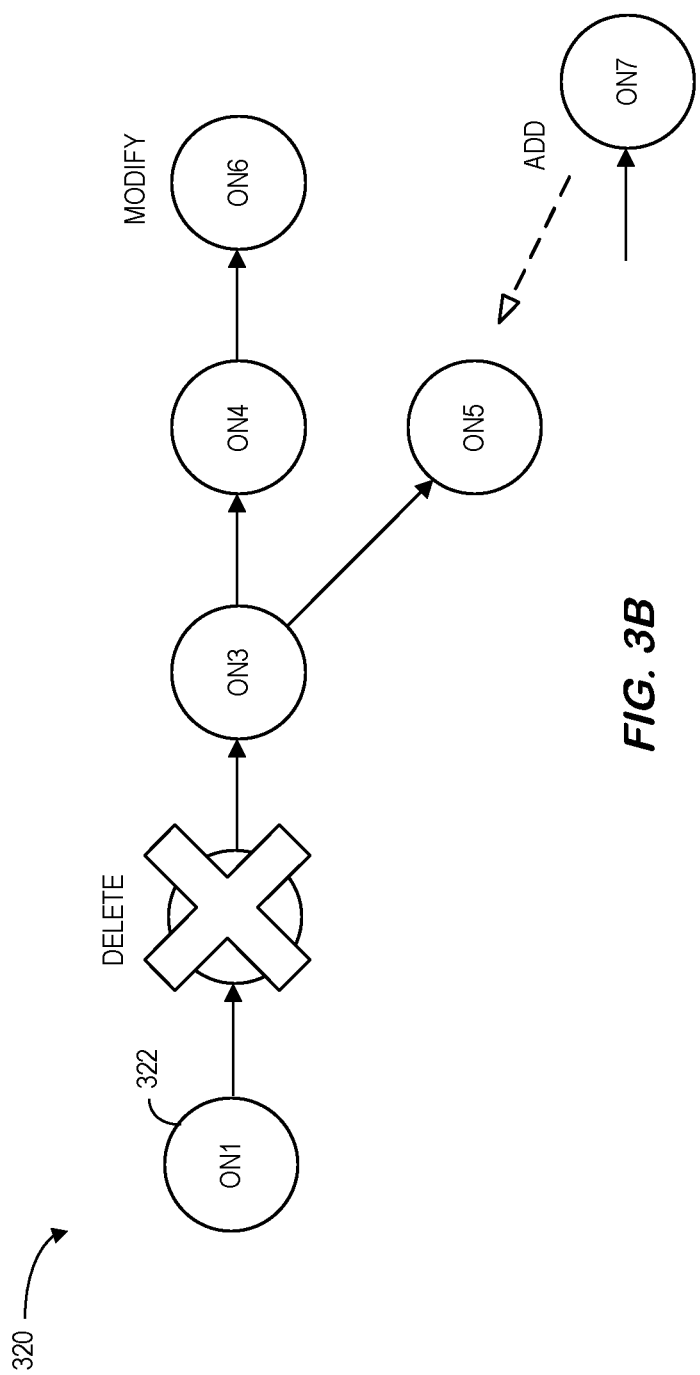
Figure 3C:
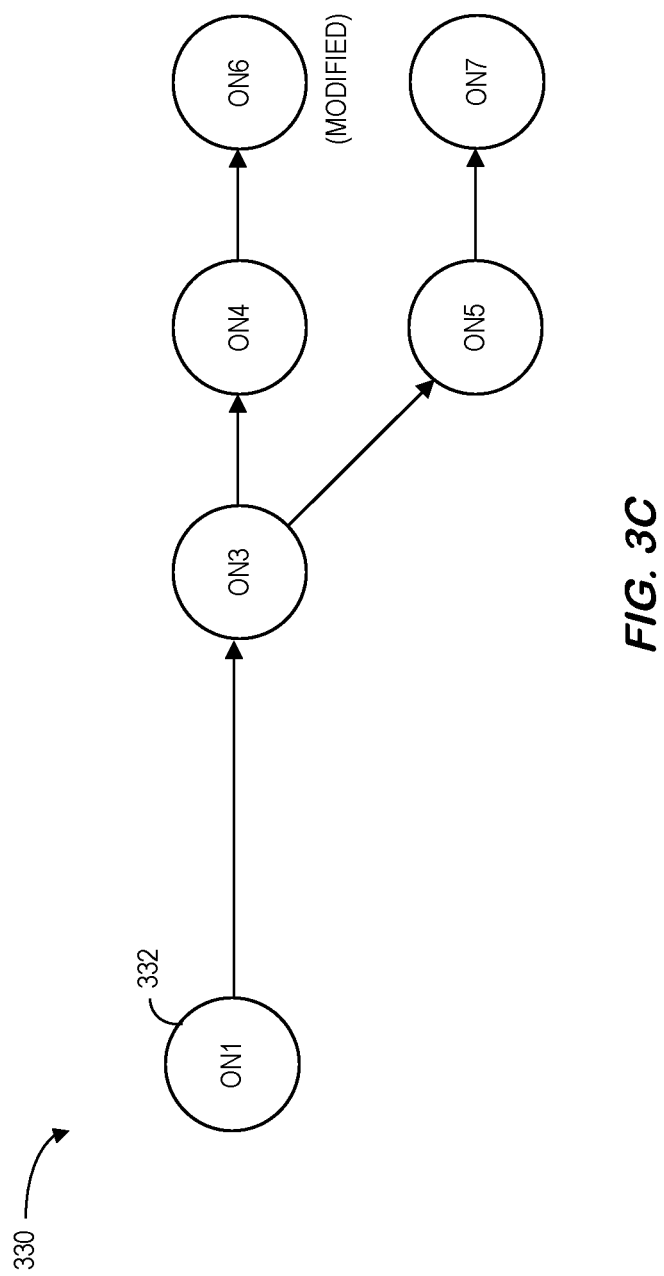

According to some embodiments, a predictive model may be defined as a pipeline of operation nodes. FIGS. 3A through 3C illustrate predictive model pipelines according to some embodiments. In particular, FIG. 3A illustrates a predictive model pipeline 300 including operation nodes 312 ON1 through ON6. Note that some nodes 312 may potentially branch to different paths of the pipeline 310 (e.g., node ON3 could lead to ON4 or ON5). Moreover, nodes 312 have parent or "ancestor" nodes (e.g., node ON5 has ancestor nodes of ON1, ON2, and ON3—but not ON4 or ON5).

Note that building an optimal predictive model represented as such a pipeline 310 of data operations (e.g., to be executed in-memory) may rely on an iterative and complex process during which a user may attempt to improve the overall modeling performance by trying different predictive algorithms (a Random Forest algorithm, a Support Vector Machine, etc.), different hyper-parameters, different data transformation (also known as feature engineering), etc.

Such a predictive model pipeline 310 may built and executed gradually with successive modifications (e.g., an addition, deletion, or alteration of an operation). For example, FIG. 3B illustrates a predictive model pipeline 320 where operation node 322 ON2 is being deleted, ON7 is being added (to ON5) and ON6 is being modified. FIG. 3C illustrates a predictive model pipeline 330 showing the structure of operation nodes 332 after those three changes have been applied.

Note that the predictive model pipeline 330 may commonly operate on huge datasets (e.g., a dataset having millions of rows) to achieve statistical significance. As a result, re-executing previously defined operations every time the pipeline 330 can be a time consuming and computationally expensive process. A user who is modifying the pipeline may expect a predictive system to be smart enough to execute only a minimum set of operations by leveraging data results produced in the previous run. Supporting this type of "incremental" execution may provide an advantage in the machine learning modeling tool market. In particular, it may enable an interactive experience (where the user can quickly modify the pipeline 330, re-execute, and analyze results) during creation of the predictive model pipeline 330.

Figure 4:
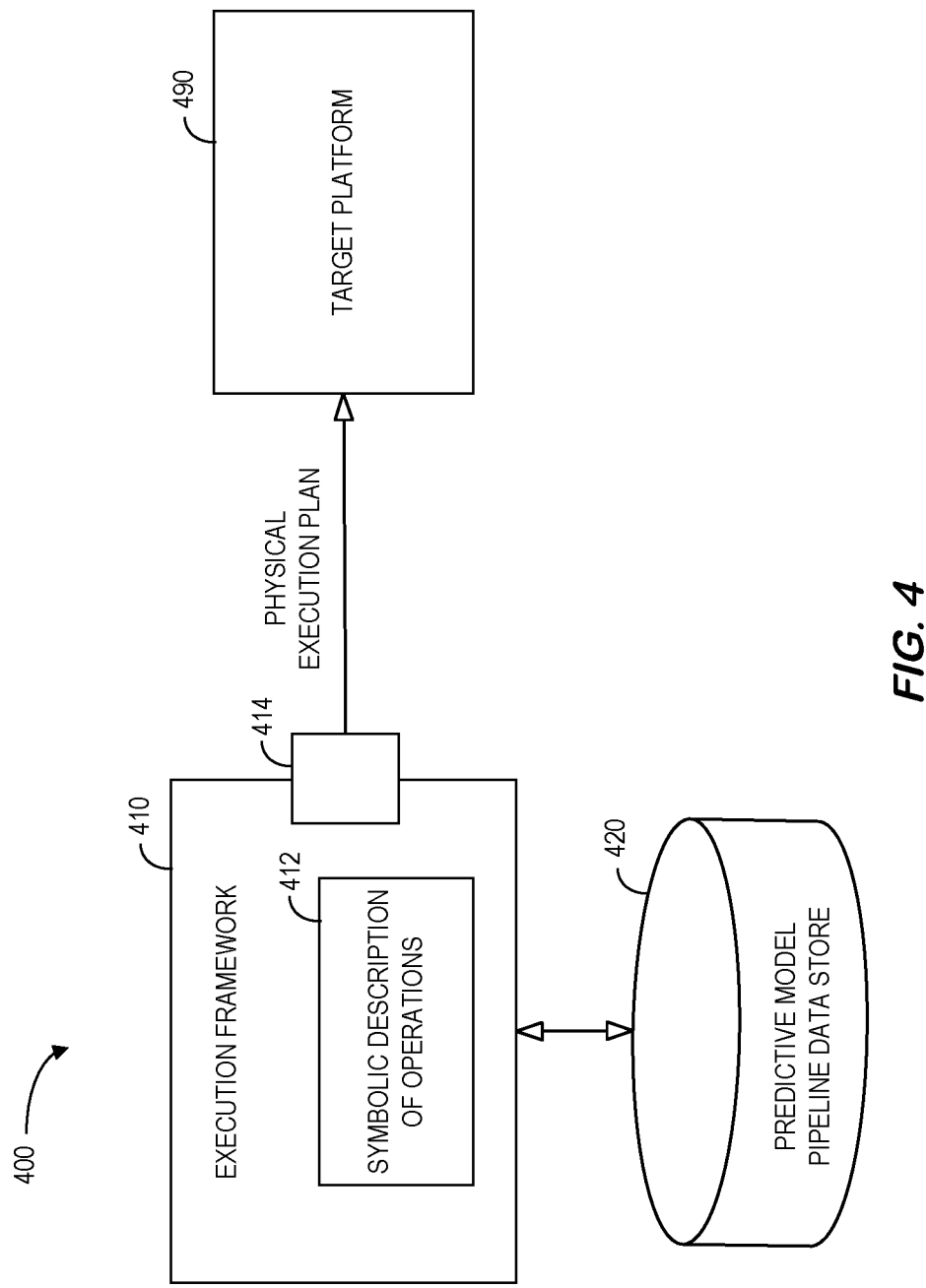
FIG. 4 is a high-level block diagram of a system in accordance with some embodiments.

To achieve such results, FIG. 4 is a high-level block diagram of a system 400 in accordance with some embodiments. The system 400 includes an execution framework 410 that provides a physical execution plan to a target platform 490 (e.g., the HANA® in-memory, column-oriented, relational database management system available from SAP® SE) via a communication port 414. In particular, the execution framework 410 retrieve information from a predictive model pipeline data store 420 to create a symbolic description of operations 412 (i.e., the "pipeline") and then use that description to create an appropriate physical execution plan. The process might be performed automatically or be initiated via a simple command from a remote user interface device. As used herein, the term "automatically" may refer to, for example, actions that can be performed with little or no human intervention.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The execution framework 410 may store information into and/or retrieve information from various data stores, which may be locally stored or reside remote from the execution framework 410. Although a single execution framework 410 is shown in FIG. 4, any number of such devices may be included. Moreover, various devices described herein might be combined according to embodiments of the present invention. For example, in some embodiments, the predictive model pipeline data store 420 and the execution framework 410 might comprise a single apparatus. The system 400 functions may be performed by a constellation of networked apparatuses, such as in a distributed processing or cloud-based architecture.

A user may access the system 400 via a remote device (e.g., a Personal Computer ("PC"), tablet, or smartphone) to view information about and/or manage pipeline information in accordance with any of the embodiments described herein. In some cases, an interactive graphical user interface display may let an operator or administrator define and/or adjust certain parameters (e.g., to change the path of a pipeline) and/or provide or receive automatically generated recommendations or results from the system 400.

Figure 5:
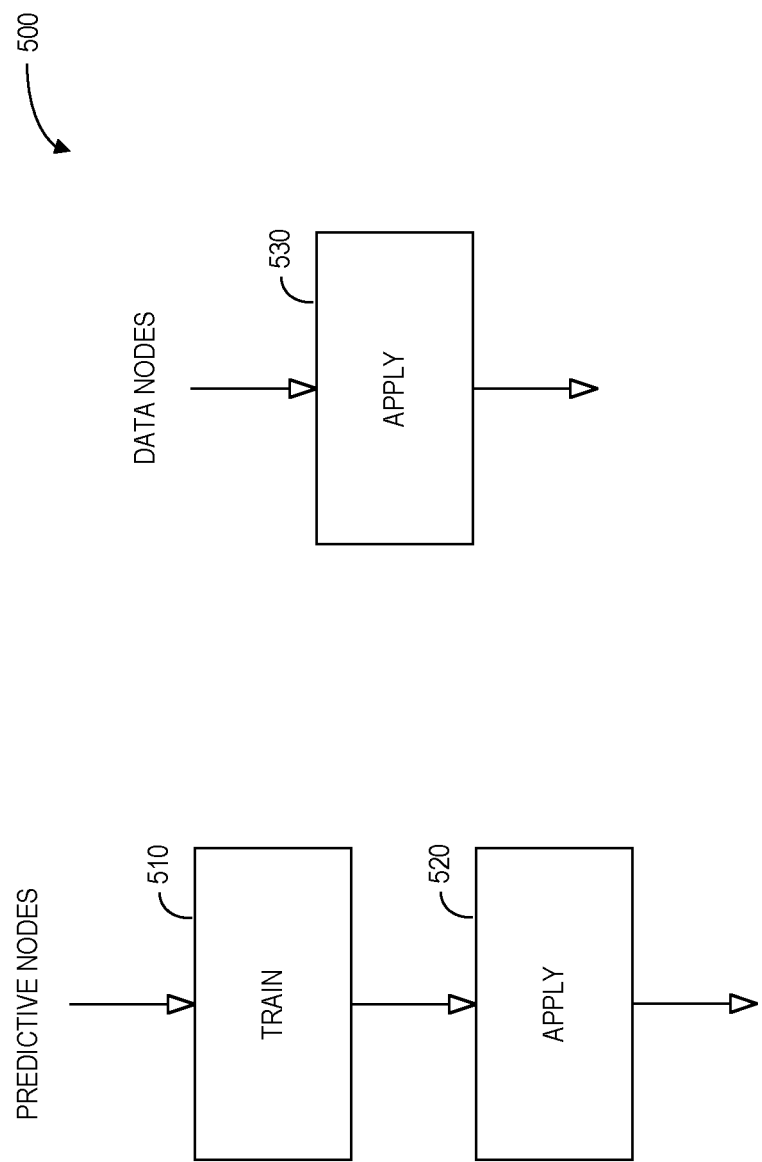
FIG. 5 illustrates different types of operation nodes according to some embodiments.

FIG. 5 illustrates 500 different types of operation nodes that might be included in a pipeline according to some embodiments. Some operation nodes require 2-phases of processing: TRAIN 510 or LEARN first on data (model construction) and optionally APPLY 520 the trained model to output new enriched flowing data. These are called predictive nodes. Other operation nodes don't have training during the intermediate stage but only hold a straight data transformation logic which doesn't depend on data context. These are called data nodes. To harmonize the node processing description, we will name this 1-phase transform as APPLY 430 processing. Note that the TRAIN 510 phase (learning) is much more time and resource expensive as compared to the APPLY 520, 530 phase. Therefore, it may be worth it to cache the outcome of the TRAIN 510 task (in fact, the predictive model) and it can reasonably be assumed that caching is less meaningful for the data nodes.

Figure 6:
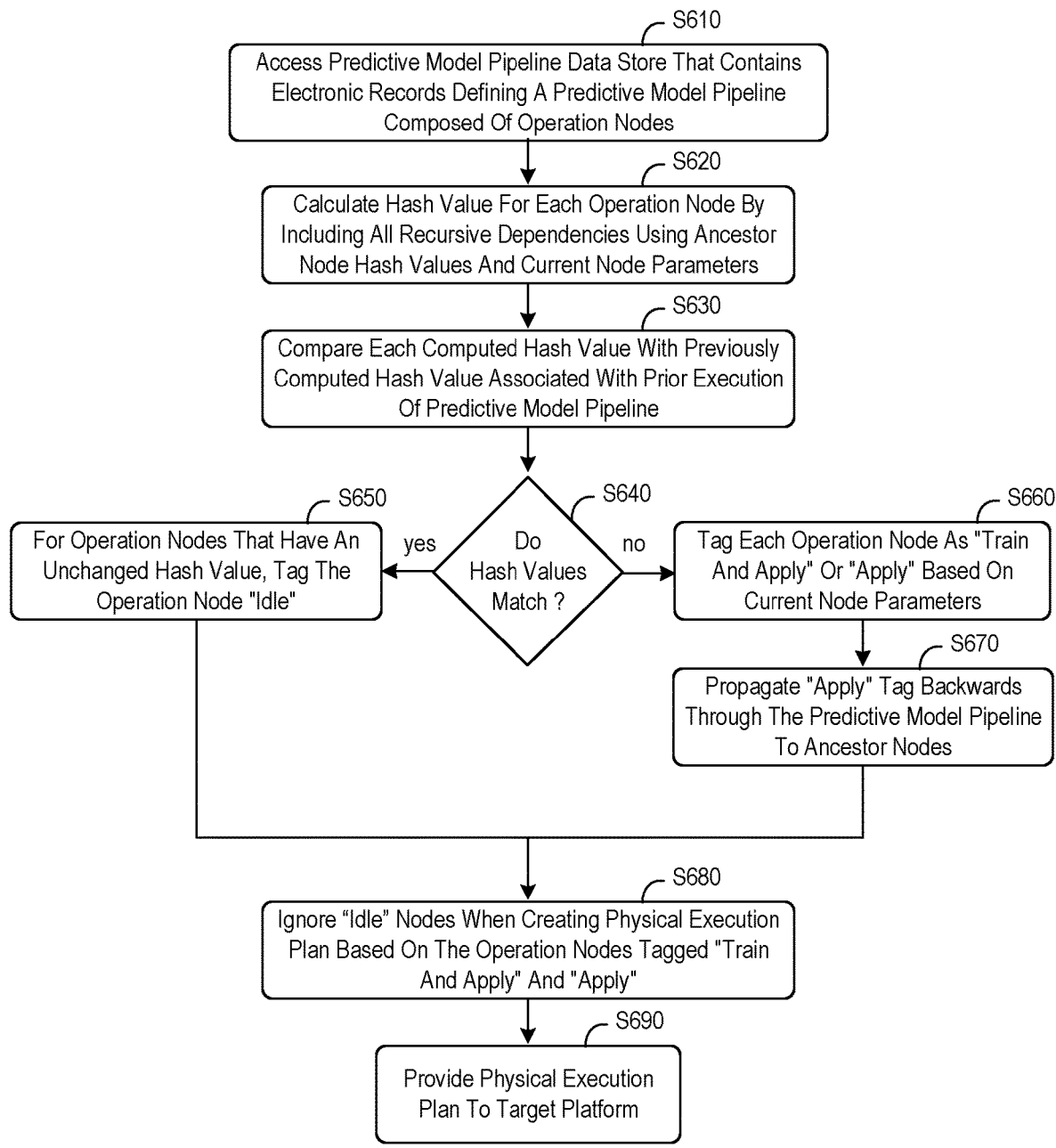
FIG. 6 is a method according to some embodiments.

According to some embodiments, incremental execution support at compilation time is supported as shown in FIG. 6 which shows a method that might performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

Figure 7:
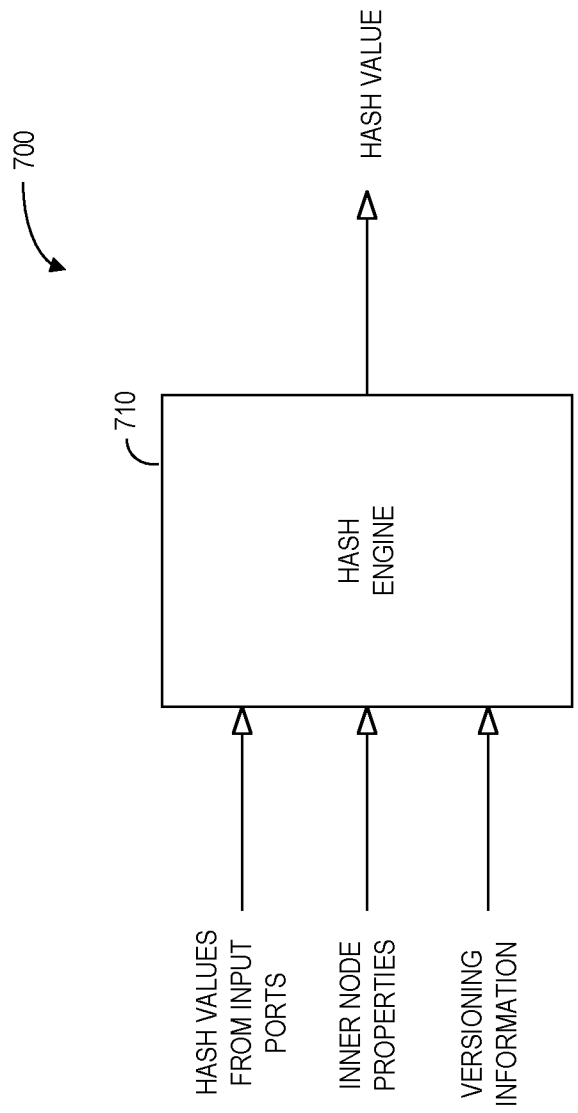
FIG. 7 is a system for computing operation node hash values in accordance with some embodiments.

At S610, a computer processor of an execution framework platform may access a predictive model pipeline data store that contains electronic records defining a predictive model pipeline (e.g., an in-database pipeline) composed of operation nodes. Based on the information in the predictive pipeline data store, at S620 the system may calculate a hash value for each operation node by including all recursive dependencies using ancestor node hash values and current node parameters. For example, FIG. 7 is a system 700 for computing operation node hash values in accordance with some embodiments. To avoid a sophisticated comparison of the pipelines (the previous pipeline that was executed as compared to the new pipeline to be executed), some embodiments compute for each node a hash value carrying the signature of all its recursive dependencies which actually influence its output results. According to some embodiments, this hash value is defined at an output port level to handle an incremental evaluation per output port. This node level hash value generated by a hash engine may take into account, for example, the following inputs: hash values from its input ports (in some cases, maintaining order sensitivity for multiple cardinality); inner node properties (convergence rate, etc.); and versioning information (runtime version, node, etc.). Note that the system 700 might not capture any data source changes at the schema or row level, but instead only those changes that happen to the pipeline specification itself (added/removed/updated node).

Referring again to FIG. 6, at S640 the system may compare each computed hash value with a previously computed hash value associated with a prior execution of the predictive model pipeline. The predictive model pipeline may differ from the prior version of the predictive model pipeline because of, for example: an addition of an operation nodes, a deletion of an operation node, or an alteration of an operation node.

If the hash tag values match at S640, the system tags the operation node as "idle" at S650. If the has tag values do not match at S650, the system tags each operation node as "train and apply" (for operation nodes that comprise predictive nodes that first learn on data to train a model and the apply the trained model to new data) or "apply" (for operation nodes that comprise data nodes that implement data transformation logic) based on current node parameters at S660. The system may also propagate an "apply" tag backwards through the predictive model pipeline to ancestor nodes at S670 to indicate that the current node needs to be re-evaluated and also to request the incoming data produced by the ancestor node apply operations. Note that if no prior hash value exists for a node (for example, the node might have been newly added), it may be considered that the hash value does not match at S650.

At S680, the system may ignore the operation nodes tagged "idle" when creating the physical execution plan based on the operation nodes tagged "train and apply" and "apply." At S690, the system may provide the physical execution plan to a target platform (e.g., HANA®).

According to some embodiments, a cache may store execution results of predictive nodes for re-use during a subsequent execution of the predictive model pipeline (without storing execution results of data nodes). For example, the system may determine which results are worth to be cached. According to some embodiments, the system may distinguish a TRAIN outcome from an APPLY outcome in the caching strategy. Note that caching data has a cost (in terms of storage space and computation time) and might therefor only be triggered for "expensive" processing like the one required to learn (TRAIN).

Figure 8:
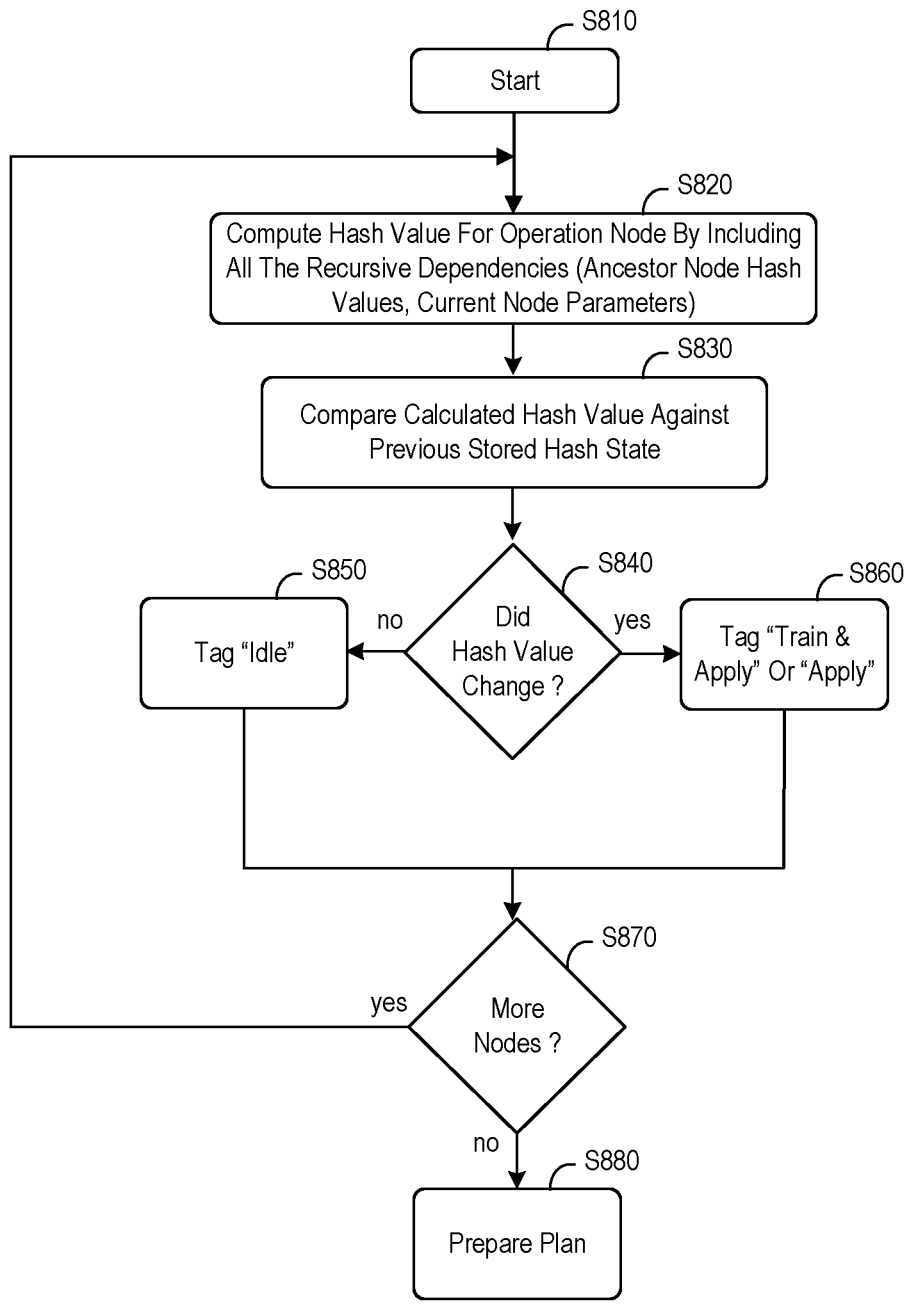
FIG. 8 is a method according to some embodiments.

FIG. 8 is a method according to some embodiments. After starting with the first operation of a predictive model pipeline at S810, the system may compute the hash value of each operation nodes by including all the recursive dependencies (ancestor node hash values, current node parameters) at S820. At S830, the system may compare the hash value against the previous stored hash state. A node with an unchanged hash vale at S840 is tagged as idle at S850. A node with changed hash value at S840 is tagged as either "to train" or "to apply" depending on the nature of the nodes at S860. Moreover, the system may propagate the "to apply" flag backwardly to the ancestor nodes from all touched nodes identified previously. If there are more nodes in the pipeline at S870, the next node is selected at the process continues S820. When all nodes have been evaluated, the system may generate the logical or physical plan at S880. Note that the system may ignore idle nodes and only consider the "to train" or "to apply" flags determined previously when generating the plan.

Figure 9:
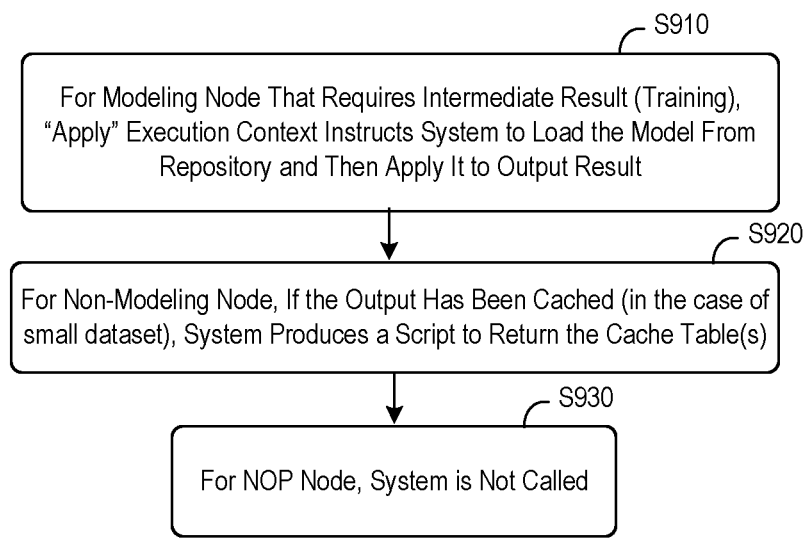
FIG. 9 is a physical execution plan generation method in accordance with some embodiments.

FIG. 9 is a physical execution plan generation method in accordance with some embodiments. For a modeling node which requires an intermediate result (trained model), "apply" execution context instructs the system to load the model from the repository and then apply it to output the result at S910. Note that the expensive learning outcome may be loaded from the cache (e.g., the repository) which is still up-to-date considering the incremental change on the pipeline definition as compared to the previous persisted state. For a non-modeling node, "train & apply" and "apply" contexts may be strictly similar because there is no internal training phase. If the output has been cached (in case of small dataset), the system may produce a script return the cache table(s) at S920. For a No Operation ("NOP") node, the system is not called (the presence of the NOP may only be necessary to extend the lifespan of related persisted artifacts).

A runtime framework may collect all identifiers of the present pipeline nodes and build a generic cleanup procedure of deprecated artifacts. According to some embodiments, this is based on a naming convention where a predicate might be "node ID token" is part of present node IDs with an "apply" or "NOP" flag. This cleanup procedure may be injected into the main prepare procedure.

Thus, with some basic concepts like hashing to facilitate the detection of complex dependency changes, practical common sense (caching only expensive training outcomes), and back propagation of processing type (TRAIN or APPLY), embodiments may address incremental execution agnostically.

Figure 10:
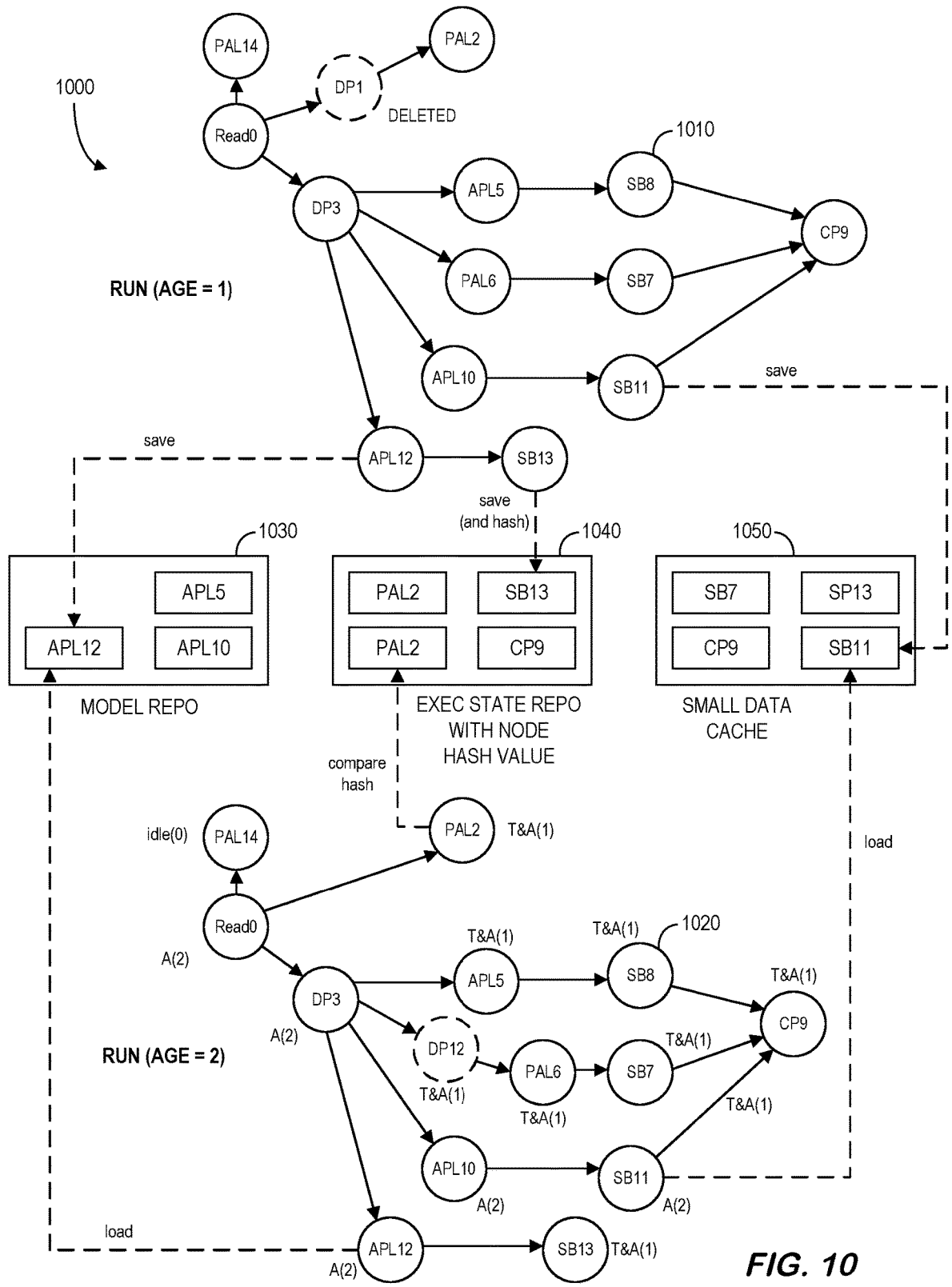
FIG. 10 is an example of predictive model pipeline execution according to some embodiments.

FIG. 10 is an example 1000 of predictive model pipeline execution according to some embodiments. The example 1000 includes operation nodes are associated with Data Preparation ("DP"), an Automated Predictive Library ("APL"), a Predictive Algorithm Library ("PAL"), a Statistics Builder ("SB"), or a model Compare ("CP"). Note that incremental execution may be desired for a design time user experience during which a pipeline is built and executed gradually. The user may expect that each iteration will not perform the entire pipeline computation from scratch (but only the incremental one required in view of the changes). For that purpose, each node may persist into a HANA system its intermediate or final results (intermediate result is typically the trained model). These persisted artifacts can be reloaded instead of being recomputed on the next run if its recursive dependencies stay unchanged from the previous run. It may be recommended to not cache a huge output dataset (e.g., data preparation) to avoid abusive space and/or processing consumption.

The pipeline node execution may serialize an intermediate result and not the final output result: it's the case for the modeling node which handles the execution in 2 phases (note that a learn node may be time consuming with a small output size whereas an apply node is usually fast with a huge output size). One of the comparison requirements may be that node identifier is stable over pipeline modifications. For example, modifying the properties of a given node should not alter its identifier. Note that the example 1000 of FIG. 10 includes model repository storage 1030, an execution state repository with node hash value 1040, and a small data cache 1050.

FIG. 10 illustrates executing a pipeline (RUN age=1 1010), modifying the pipeline (by deleting DP1 and adding DP12), and then re-executing the pipeline (RUN age=2 1020). For the first run 1010, prior to the effective compilation phase, the system may compute all node hash values. A batch script may contain per-node instructions to persist the outputs (model, small data, etc.) and the execution state may include the hash value. Note that AP12 is saved into the model repository 1030, SB13 is saved into the small data cache, and SB13 is saved (along with the computed hash value) into the execution state repository 1040.

For the second run 1020, the system may compute all node hash values of the new pipeline load node information from the execution state repository 1040 by default and tag all nodes with a "NOP" execution flag ("idle"). The system may then compare the new and previous hash values based on the node identifier (e.g., the hash value of PAL2 is compared based on information in the execution state repository 1040). When the execution state repository 1040 does not have an entry (it is a newly added node or a previous node which that is not yet computed), a failure state, or different hash values, the node is tagged with a "train and apply" flag ("T&A(1)"). The nodes with a "T&A (1)" flag that have a different hash value due to the impact of the detected changes of its recursive dependencies (ancestors) propagate recursively from all nodes marked as "T&A (1)" to their ancestors, are tagged with an "apply" flag ("A(2)"). Note that all outputs capable of being iterated should also propagate backwardly the "apply" flag at physical plan generation, so the system may take care of the execution context (idle, T&A(1) or A(2)) to perform the ad hoc script generation.

Figure 11:
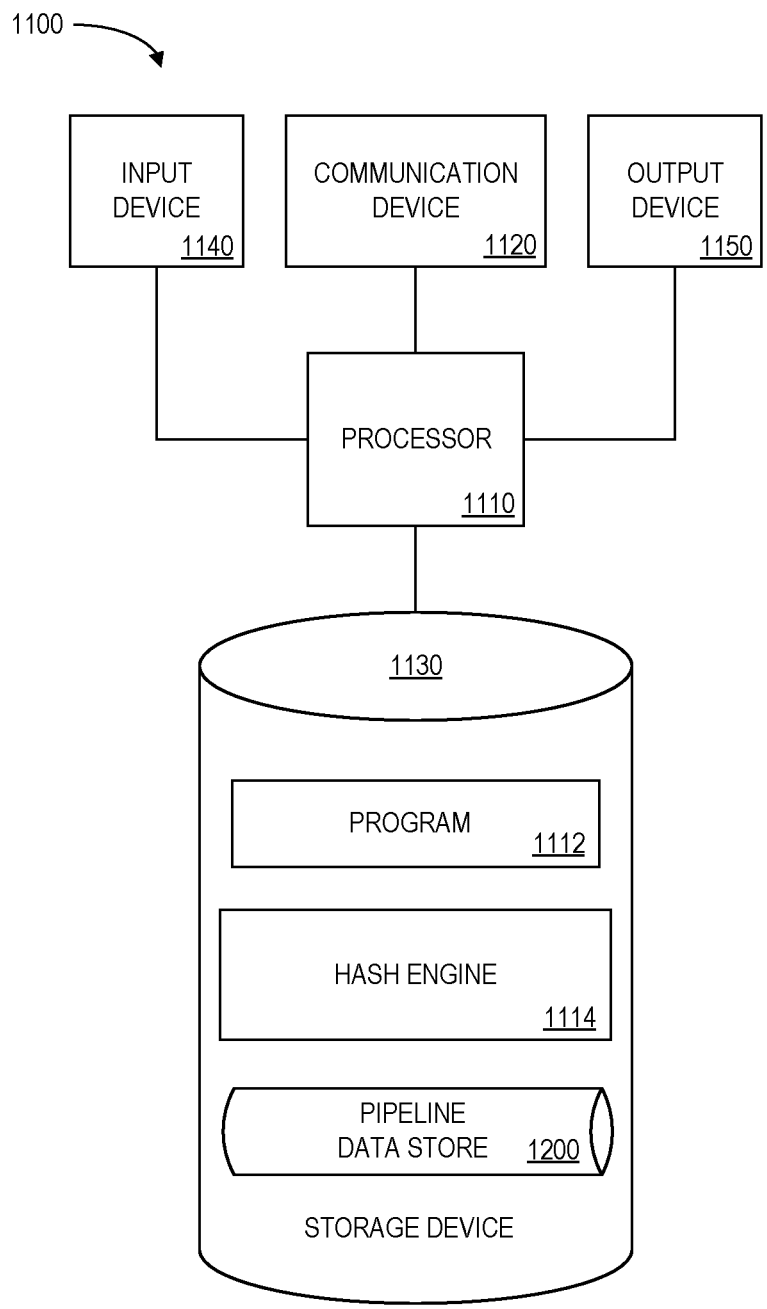
FIG. 11 is an apparatus or platform according to some embodiments.

Embodiments described herein may also be implemented using any number of different hardware configurations. For example, FIG. 11 is a block diagram of an apparatus or platform 1100 that may be, for example, associated with the system 400 of FIG. 4 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, central component platforms, etc. The platform 1100 further includes an input device 1140 (e.g., a computer mouse and/or keyboard to input pipeline parameters) and/an output device 1150 (e.g., a computer monitor to render a display, transmit results, and/or create reports about predictive model performance). According to some embodiments, a mobile device, monitoring physical system, and/or PC may be used to exchange information with the platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a hash engine 1114 for controlling the processor 1110. The processor 1110 performs instructions of the programs 1112, 1114, and thereby operates in accordance with any of the embodiments described herein. For example, the processor 1110 may calculate a hash value for each operation node by including all recursive dependencies using ancestor node hash values and current node parameters. The processor 1110 may then compare each computed hash value with a previously computed hash value associated with a prior execution of a prior version of the pipeline. Operation nodes that have an unchanged hash value may be tagged "idle" by the processor 1110. Operation nodes that have a changed hash value may be tagged "train and apply" or "apply" by the processor 1110 based on current node parameters (and an "apply" tag may propagate backwards through the pipeline to ancestor nodes). The processor 1110 may then ignore the operation nodes tagged "idle" when creating a physical execution plan to be provided to a target platform.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a pipeline data store 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 is portion of a tabular migration data store in accordance with some embodiments.

Referring to FIG. 12, a table is shown that represents the pipeline data store 1200 that may be stored at the platform 1100 according to some embodiments. The table may include, for example, entries identifying virtual machines that have been automatically moved from a source provider to a target provider. The table may also define fields 1202, 1204, 1206, 1208, 1210, 1212, 1214 for each of the entries. The fields 1202, 1204, 1206, 1208, 1210, 1212, 1214 may, according to some embodiments, specify: a pipeline identifier 1202, a node identifier 1204, ancestor nodes 1206, a node type 1208, node properties 1210, and a hash value 1212. The pipeline data store 1200 may be created and updated, for example, when new a user modifies a pipeline, when a pipeline is executed, etc.

The pipeline identifier 1202 might be a unique alphanumeric label or link that is associated with an in-database, predictive model pipeline being executed. The node identifier 1204 might adhere to a naming convention to identify a particular operation node in the pipeline. The ancestor nodes 1206 might contain the node identifiers 1004 of parent nodes. The node type 1208 might indicate a function associated with the node (e.g., NOP or idle, Apply ("Apply(2)"), Train and Apply ("Train then Apply(1)"). The node properties 1210 might include inner node properties, versioning information, etc. The hash value 1212 might be calculated based on the other information in the pipeline data store and used to determine if that particular node needs to be re-executed in the future pipeline run.

Figure 13:
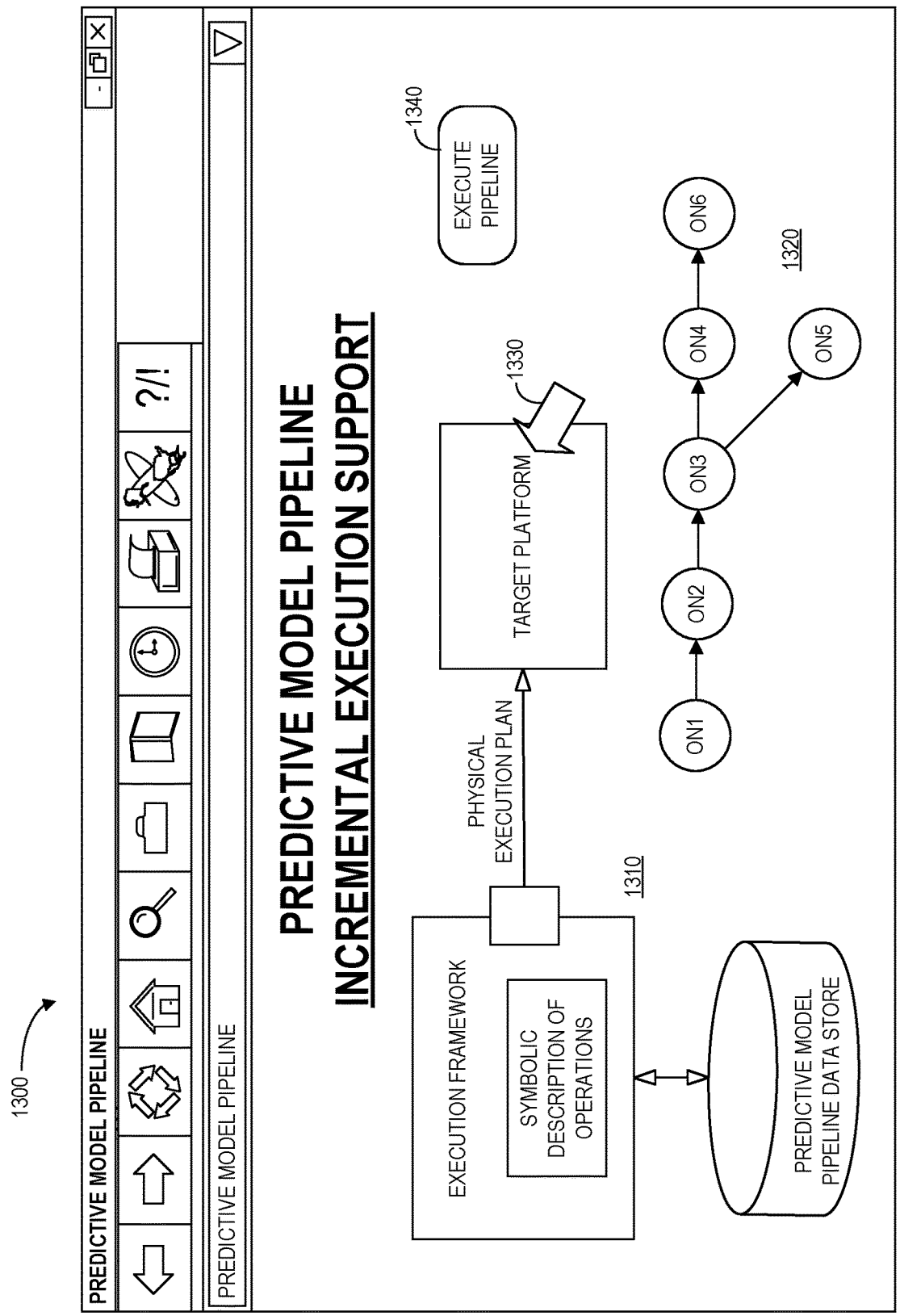
FIG. 13 is a human machine interface display according to some embodiments.

FIG. 13 is a human machine interface display 1300 for predictive model pipeline incremental execution support in accordance with some embodiments. The display 1300 includes a graphical representation of elements of a system 1310, including an execution framework platform, along with a representation of a predictive model pipeline 1320. Selection of an element (e.g., via a touch-screen or computer pointer 1330) may result in display of a pop-up window containing various options (e.g., to view an execution status, resource requirements, etc.). The display 1300 may also include a user-selectable "Execute Pipeline" icon 1340 to initiate an automated pipeline execution process.

Thus, embodiments may provide for incremental execution of a predictive model pipeline. Moreover, embodiments may provide incremental handling that is generic and thus easily transferable/applicable for many target runtimes (e.g., RDBMS, Hadoop, etc.).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of predictive models, any of the embodiments described herein could be applied to other types of predictive models. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
   an in-memory, column-oriented Relational DataBase Management System ("RDBMS") apparatus;
   a predictive model pipeline data store that contains electronic records defining an in-database predictive model pipeline composed of operation nodes;
   an output port, coupled to the target apparatus, to transmit a physical execution plan to the target apparatus; and
   an incremental execution framework apparatus, coupled to the predictive model pipeline data store and the output port, including:
   a cluster of computer processors, and
   a computer memory storing instructions that, when executed by the cluster of computer processors, cause the incremental execution framework apparatus to perform the following:
      (i) access the predictive model pipeline data store,
      (ii) based on the information in the predictive pipeline data store, automatically calculate a hash value for each operation node by including all recursive dependencies using ancestor node hash values and current node parameters,
      (iii) compare each computed hash value with a previously computed hash value associated with a prior execution of a prior version of the in-database predictive model pipeline,
      (iv) for operation nodes that have an unchanged hash value, automatically tag the operation node as "idle,"

(v) for operation nodes that have a changed hash value, automatically:
   (a) tag each operation node as "train and apply" or "apply" based on current node parameters, and
   (b) propagate an "apply" tag backwards through the in-database predictive model pipeline to ancestor nodes,
(vi) ignore the operation nodes tagged "idle" when creating the physical execution plan based on the operation nodes tagged "train and apply" and "apply," and
(vii) transmit the physical execution plan to the in-memory, column-oriented RDBMS apparatus via the output port.

2. The system of claim 1, wherein a hash value for an operation node is calculated based on hash values from input ports, inner node properties, and versioning information.

3. The system of claim 1, wherein some operation nodes comprise predictive nodes that first learn on data to train a model and the apply the trained model to new data.

4. The system of claim 3, wherein some operation nodes comprise data nodes that implement data transformation logic.

5. The system of claim 4, further comprising:
a cache to store a learning outcome model of predictive nodes for re-use during a subsequent execution of the in-database predictive model pipeline without storing execution results of data nodes.

6. The system of claim 1, wherein the in-database predictive model pipeline differs from the prior version of the in-database predictive model pipeline because of at least one of: (i) an addition of an operation nodes, (ii) a deletion of an operation node, and (iii) alteration of an operation node.

7. The system of claim 1, wherein at least some operation nodes are associated with at least one of: (i) data preparation, (ii) an automated predictive library, (iii) a predictive algorithm library, (iv) a statistics builder, and (v) a model compare.

8. A computer-implemented method, comprising:
accessing, by a cluster of computer processors of an incremental execution framework apparatus, a predictive model pipeline data store that contains electronic records defining an in-database predictive model pipeline composed of operation nodes;
based on the information in the predictive pipeline data store, automatically calculating a hash value for each operation node by including all recursive dependencies using ancestor node hash values and current node parameters;
comparing each computed hash value with a previously computed hash value associated with a prior execution of the in-database predictive model pipeline;
for operation nodes that have an unchanged hash value, automatically tagging the operation node as "idle;"
for operation nodes that have a changed hash value, automatically:
   (a) tagging each operation node as "train and apply" or "apply" based on current node parameters, and
   (b) propagating an "apply" tag backwards through the in-database predictive model pipeline to ancestor nodes;
ignoring the operation nodes tagged "idle" when creating the physical execution plan based on the operation nodes tagged "train and apply" and "apply;" and
transmitting the physical execution plan to an in-memory, column-oriented Relational DataBase Management System ("RDBMS") apparatus via an output port coupled to the incremental execution framework apparatus and the in-memory, column-oriented RDBMS apparatus.

9. The method of claim 8, wherein a hash value for an operation node is calculated based on hash values from input ports, inner node properties, and versioning information.

10. The method of claim 8, wherein some operation nodes comprise predictive nodes that first learn on data to train a model and the apply the trained model to new data.

11. The method of claim 10, wherein some operation nodes comprise data nodes that implement data transformation logic.

12. The method of claim 11, further comprising:
a cache to store a learning outcome model of predictive nodes for re-use during a subsequent execution of the in-database predictive model pipeline without storing execution results of data nodes.

13. The method of claim 8, wherein the in-database predictive model pipeline differs from the prior version of the in-database predictive model pipeline because of at least one of: (i) an addition of an operation nodes, (ii) a deletion of an operation node, and (iii) alteration of an operation node.

14. The method of claim 8, wherein at least some operation nodes are associated with at least one of: (i) data preparation, (ii) an automated predictive library, (iii) a predictive algorithm library, (iv) a statistics builder, and (v) a model compare.

15. A non-transitory, computer readable medium having executable instructions stored therein, the medium comprising:
instructions to access, by a cluster of computer processors of an incremental execution framework apparatus, a predictive model pipeline data store that contains electronic records defining an in-database predictive model pipeline composed of operation nodes;
based on the information in the predictive pipeline data store, instructions to automatically calculate a hash value for each operation node by including all recursive dependencies using ancestor node hash values and current node parameters;
instructions to compare each computed hash value with a previously computed hash value associated with a prior execution of the in-database predictive model pipeline;
for operation nodes that have an unchanged hash value, instructions to automatically tag the operation node as "idle;"
for operation nodes that have a changed hash value:
   instructions to automatically tag each operation node as "train and apply" or "apply" based on current node parameters, and
   instructions to automatically propagate an "apply" tag backwards through the in-database predictive model pipeline to ancestor nodes;
instructions to ignore the operation nodes tagged "idle" when creating the physical execution plan based on the operation nodes tagged "train and apply" and "apply;" and
instructions to transmit the physical execution plan to an in-memory, column-oriented Relational DataBase Management System ("RDBMS") apparatus via an output port coupled to the incremental execution framework apparatus and the in-memory, column-oriented RDBMS apparatus.

16. The medium of claim 15, wherein a hash value for an operation node is calculated based on hash values from input ports, inner node properties, and versioning information.

17. The medium of claim 15, wherein some operation nodes comprise predictive nodes that first learn on data to train a model and the apply the trained model to new data.

18. The medium of claim 17, wherein some operation nodes comprise data nodes that implement data transformation logic.

19. The medium of claim 18, further comprising:
a cache to store a learning outcome model of predictive nodes for re-use during a subsequent execution of the in-database predictive model pipeline without storing execution results of data nodes.

20. The medium of claim 15, wherein the in-database predictive model pipeline differs from the prior version of the in-database predictive model pipeline because of at least one of: (i) an addition of an operation nodes, (ii) a deletion of an operation node, and (iii) alteration of an operation node.

* * * * *